(12) United States Patent
Nelson et al.

(10) Patent No.: US 6,716,935 B1
(45) Date of Patent: Apr. 6, 2004

(54) CONTINUOUS PROCESS FOR THE PRODUCTION OF CONTROLLED ARCHITECTURE MATERIALS UNDER HIGH SOLIDS LOADING CONDITIONS

(75) Inventors: James Michael Nelson, Roseville, MN (US); Ryan E. Marx, Cottage Grove, MN (US); Michael John Annen, Hudson, WI (US); Duane Douglas Fansler, Dresser, WI (US); Maureen Ann Kavanagh, Stanchfield, MN (US); Babu Nana Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/324,242

(22) Filed: Dec. 19, 2002

(51) Int. Cl.[7] .................................................. C08F 2/00
(52) U.S. Cl. ..................... 526/64; 526/173; 526/263; 526/265; 526/328.5; 526/329.1; 526/392.2; 526/338; 526/347

(58) Field of Search .................................. 526/473, 263, 526/265, 328.5, 329.1, 392.2, 338, 347, 64

(56) References Cited

U.S. PATENT DOCUMENTS

| 4,321,344 A | 3/1982 | Sumitani et al. |
| 5,166,260 A | 11/1992 | Buonerba et al. |
| 5,644,007 A | 7/1997 | Davidson et al. |
| 5,814,278 A | 9/1998 | Maistrovich et al. |
| 5,882,604 A | 3/1999 | Maistrovich et al. |
| 6,114,461 A * | 9/2000 | Preti et al. .................. 525/298 |
| 6,448,353 B1 | 9/2002 | Nelson et al. |

FOREIGN PATENT DOCUMENTS

EP        0 936 225 A1        8/1999

* cited by examiner

Primary Examiner—Helen L. Pezzuto
(74) Attorney, Agent, or Firm—Sean J. Edman

(57) ABSTRACT

The present invention discloses a continuous process for the production of polymerized controlled architectures materials under high solids loading conditions. The materials are made under stirred, plug-flow and temperature-controlled conditions.

23 Claims, 1 Drawing Sheet

CONTINUOUS PROCESS FOR THE PRODUCTION OF CONTROLLED ARCHITECTURE MATERIALS UNDER HIGH SOLIDS LOADING CONDITIONS

FIELD OF THE INVENTION

The present invention relates to a continuous process for the production of polymer using high solids loadings of polymerizable monomers in a stirred, plug-flow, temperature-controlled reactor.

BACKGROUND INFORMATION

Various types of polymers can be prepared from different monomeric materials, the particular type formed being generally dependent upon the procedures followed in contacting the materials during polymerization. For example, random copolymers can be prepared by the simultaneous reaction of the copolymerizable monomers. Block copolymers are formed by sequentially polymerizing different monomers. Useful classes of polymers can be synthesized via anionic, cationic, and free-radical methods.

SUMMARY OF THE INVENTION

An ongoing need exists for processes that allow for continuously making controlled architecture polymers. Controlled architecture refers to a polymer with a designed topology (linear, branched, star, combination network), composition (block copolymer, random copolymer, homopolymer, graft copolymer, tapered or gradient copolymer), and/or functionality (end, site specific, telechelic, multifunctional, macromonomers). Of particular importance is the ability to perform controlled architecture polymerizations at high monomer concentrations or in the absence of solvent. Polymerizations at high solids offer beneficial economic and environmental advantages. The present invention addresses that need.

As used herein:

"axial mixing" means mixing in a direction parallel to the overall direction of flow in a reactor;

"block copolymer" means a polymer having at least two compositionally discrete segments, e.g., a di-block copolymer, a tri-block copolymer, a random block copolymer, and a star-branched block copolymer;

"branching agent" means a multifunctional anionically polymerizable monomer or multifunctional quenching or coupling agent, the addition of which results in the formation of starbranched polymer;

"continuous" means that reactants enter a reactor at the same time (and, generally, at the same rate) that polymer product is exiting the same reactor;

"di-block copolymer" or "tri-block copolymer" means a polymer in which all the neighboring monomer units (except at the transition point) are of the same identity, e.g., -AB is a di-block copolymer comprised of an A block and a B block that are compositionally different, ABA is a tri-block copolymer in which the A blocks are compositionally the same, but different from the B block, and ABC is a tri-block copolymer comprised of A, B, and C blocks, each compositionally different;

"high solids loading" refers to a solution in which the initial reactants and/or reaction products comprise more than 50 wt % solids to an upper limit of 100 wt % solids;

"living anionic polymerization" means, in general, a chain polymerization that proceeds via an anionic mechanism without chain termination or chain transfer. (For a more complete discussion of this topic, see *Anionic Polymerization Principles and Applications*. H. L. Hsieh, R. P. Quirk, Marcel Dekker, NY, N.Y. 1996. Pg 72–127);

"living end" means a polymerizable reactive site, present in the absence of termination at the end of a polymer chain;

"oligomeric" means a polymer molecule consisting of only a few monomer units (e.g., dimers, trimers, tetramers);

"plug" means a three dimensional slice of the reaction mixture;

"plug flow reactor (PFR)" means a reactor that ideally operates without axial mixing (see An Introduction to Chemical Engineering Kinetics and Reactor Design; Charles G. Hill, J. Wiley and Sons 1977, p. 251) or shows no radial variation in concentration as materials are consumed as they travel in the axial direction (see Elements of Chemical Reaction Engineering; H. Scott Fogler, Prentice Hall, 1999;

"polydispersity" means the weight average molecular weight divided by the number average molecular weight; polydispersity is reported on a polydispersity index (PDI);

"radial mixing" means mixing in a direction perpendicular to the overall direction of flow in a reactor;

"random block copolymer" means a copolymer having at least two distinct blocks wherein at least one block comprises a random arrangement of at least two types of monomer units;

"reaction zone" means that portion of a reactor or reactor system where the majority of reaction occurs;

"residence time" means the time necessary for a theoretical plug of reaction mixture to pass completely through a reactor;

"segment" refers to a block of polymer formed by the addition of a specific monomer or a branching agent;

"starbranched polymer" means a polymer consisting of several linear chains linked together at one end of each chain by a single branch or junction point (See *Anionic Polymerization Principles and Applications*. H. L. Hsieh, R. P. Quirk, Marcel Dekker, NY, N.Y. 1996. Pg 333–368);

"star-branched block polymer" or "hyper-branched block copolymer" means a polymer consisting of several linear block chains linked together at one end of each chain by a single branch or junction point, also known as a radial block copolymer (See *Anionic Polymerization Principles and Applications*. H. L. Hsieh, R. P. Quirk, Marcel Dekker, New York, N.Y. 1996. Pg 333–368);

"temperature-sensitive monomer" means a monomer susceptible to significant side reactions of the living ends with reactive sites, such as carbonyl groups, on the same, or a different, polymer chain as the reaction temperature rises; and "temperature profile" means the temperature or temperatures experienced by a reaction mixture plug over time as it moves through a reactor.

An advantage of at least one embodiment of the present invention is that the ability to control architectures at high solids offers increased convenience and favorable environmental considerations.

An advantage of at least one embodiment of the present invention is that the temperature of the reaction mixture can be controlled to such an extent that side reactions are minimized. This is especially advantageous when temperature-sensitive monomers are used.

Another advantage of at least one embodiment of the present invention is that the average molecular weight of resulting polymers can be controlled well by controlling the amount of initiator added to the reaction mixture.

Another advantage of at least one embodiment of the present invention is that various polymer architectures can be tailored and synthesized to be suitable for specific applications.

Another advantage of at least one embodiment of the present invention is that the ability to control the temperature enables the reaction materials to be maintained in solution, which facilitates the desired reaction.

Other advantages of at least one embodiment of the present invention is that it allows for controlled reaction kinetics, optimum reaction mixture viscosity and polymer solubility.

DETAILED DESCRIPTION

Figure 1:
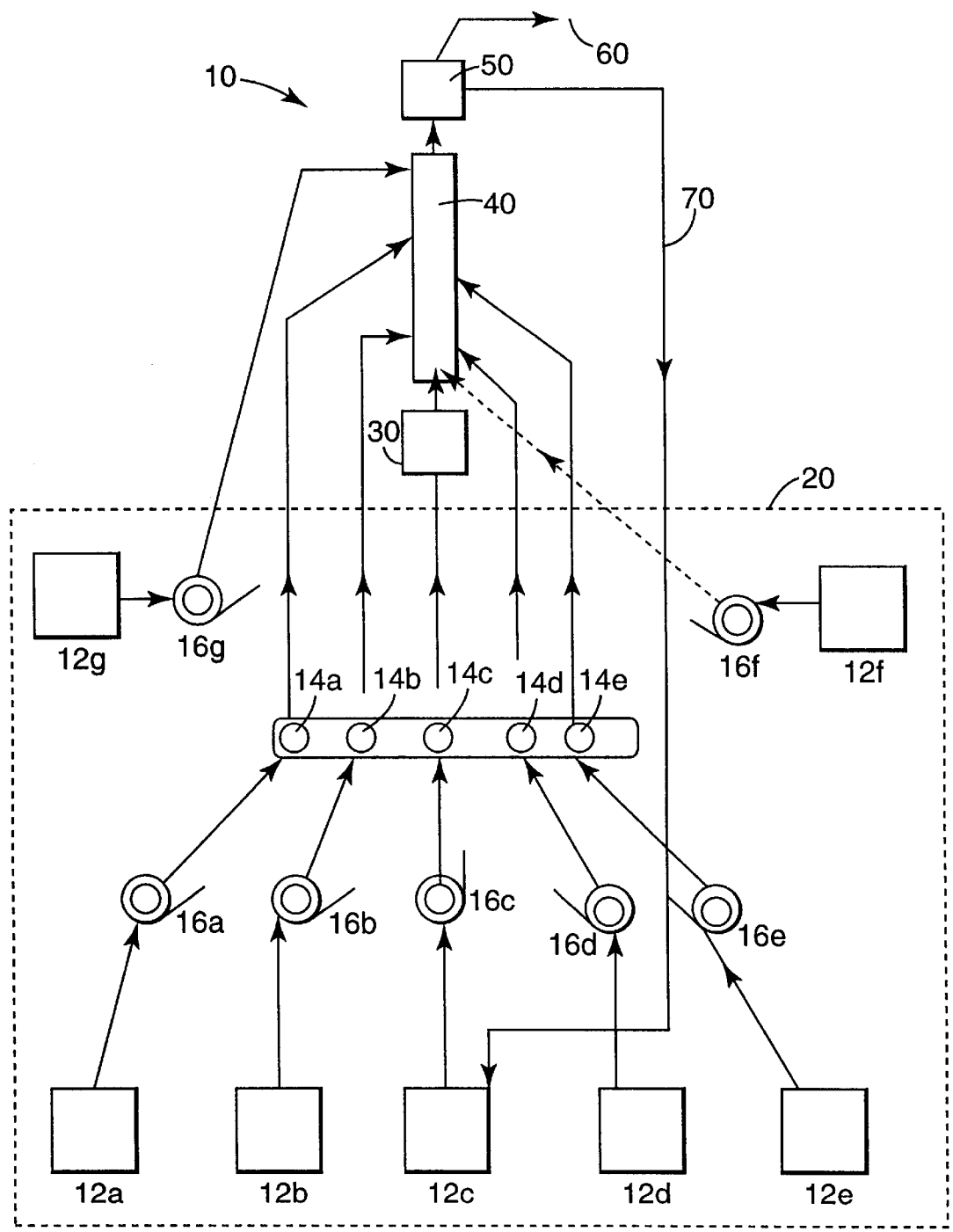
FIG. 1 is a schematic representation of an exemplary reaction system useful for carrying out the polymerization process of the present invention.

High solids loadings are typically estimated as (grams of monomer)/(grams of monomer+grams of solvent+grams of initiator) and are typically measured as (polymer)/(polymer+solution). Traditionally, polymerizations under high solids loading conditions are performed in extruders. However, there are several disadvantages in using an extruder under these conditions. For example, working with high solids loading of flammable monomers can be difficult because extruders typically have limited heat transfer capabilities. If the reaction system retains heat, flammable monomers may ignite or degrade. Additionally, it is difficult to achieve plug flow in an extruder due to a high likelihood of materials being retained in the flights and mixing elements, which results in reactor fouling. Reactor fouling becomes a serious issue at high monomer concentrations, due to the lack of the presence of a heat sink, resulting in poor heat transfer, which results in hot spots and increased fouling.

Large temperature gradients are difficult to create in an extruder, but can be achieved with a system having multiple independent temperature controlled zones such as those in reactors suitable for the present invention. For example, in temperature controlled tubular reactors, it is possible to cool an initial reaction zone to temperatures as low as −80° C. (for example, to control exotherms associated with polymerizations using anionic or free radical chemistries) while heating subsequent reaction zones to temperatures as high as 220° C. (for example, to induce polymer solubility and increase throughput by avoiding polymer fouling). The present invention allows the architecture of the produced organic material to be controlled by a number of factors including temperature or temperature profile in the reactor, the molar ratio of monomers to initiators, and monomer addition sequence. These factors affect molecular weight, polydispersity and structure of the final polymerized organic material.

The average molecular weight of the resultant polymeric material is established by controlling the monomer to initiator ratio. This ratio is established by controlling the respective monomer and initiator flow rates. Narrow molecular weight distributions can be obtained by controlling the temperature of the reaction mixture. Avoiding high temperatures minimizes unwanted side reactions that can result in polymer chains having differing molecular weight averages.

Polydispersity can be influenced by the reaction kinetics of the reaction mixture and the minimization of side reactions, especially when temperature sensitive monomers are present. Maintaining optimum temperatures in each zone of the reactor can positively influence reaction kinetics. Maintaining optimum temperatures can also advantageously affect the solution viscosity and the solubility of the reactants.

The structure of the polymerized organic material is determined by the sequence of monomer addition(s). Homopolymers are formed when only one monomer type is used, random copolymers when more that one monomer type is introduced simultaneously, and segmented block copolymers when more than one monomer type is introduced sequentially.

For the process of the present invention it is preferable that the temperature profile of the reactor be controllable over time and that the reaction mixture be impelled in a relatively plug flow manner through the reactor. This allows the reaction mixture in the reactor at a given location to be subjected to the same reaction conditions as those encountered by previous and subsequent reaction mixture portions as they pass by the same location.

Maintaining temperature control and movement of the reaction mixture in an essentially plug flow manner can be complicated by the exothermic nature of the type of reaction being performed. Some polymerization methods involving polar monomers are complicated by side reactions and an ordering phenomenon associated with the aggregation of materials in solution as micelles. This ordering phenomena becomes even more prevalent at high solids than when block or end functional architectures are diluted by solvent. Micelle formation can be dissipated by the presence of suitable polar solvents.

Block and homopolymer systems often form gels under batch or semi-batch conditions at high solids due to side reactions such as chain-chain coupling, manifested as a result of poor mixing and poor heat dissipation or transfer. In general, in batch systems, which lack good mixing capabilities, the probability of forming block structures are lessened at higher solids, due to viscosity issues. Again, homopolymer contaminants result in these poorly mixed systems.

Starbranched polymers, although once formed typically display lower solution and melt viscosity, are very sensitive to gelation events. For example, during convergant star polymer synthesis in which living anionic polymer chains are coupled by difunctional monomers, chain-chain coupling and gels can result if insufficient mixing and heat transfer are not provided Also of particular importance for commercial applicability are polymers containing polar side-chain and end-group functionality. Polymers containing functional groups can have considerable commercial applicability, finding uses as dispersants, blend compatibilizers, surfactants, surface modifiers, colloidal stabilizers, stain release agents, encapsulants, binding agents, viscosity modifiers, and (in some cases) precursors to ionomers. Important synthetic targets within this area are polymers containing carboxylic acid, hydroxyl, amine or thiol segments, due to their high polarity and water miscibility.

These materials can be very difficult to synthesize and process under high solids conditions due to hydrogen bonding considerations. Polymers containing alcohol, carboxylic acid, amine or thiol functionality display increased viscosity as molecular weight increases, due to inter- and intramolecular hydrogen bonding.

The present invention overcomes many of the problems associated with the foregoing polymerizations because it provides intensive mixing to aid in processing the materials and overcoming viscosity issues such as aggregation due to hydrogen bonding. Also it allows for the temperature control of a series of reaction zones so that one zone can be cooled to control an exotherm, then, if necessary, another zone can be heated, for example, to promote the solubility of hydrogen-bonded materials such as high molecular weight materials and co-monomers that are incorporated at high concentrations Adequate mixing and temperature control promote the ability to reproduce the same materials, e.g., having a similar average molecular weight and having a narrower polydispersity index (PDI) than obtained without temperature control. Preferably the PDI of the polymers of this invention is less than 3, more preferably less than 2, and most preferably less than 1.5.

One suitable plug-flow, temperature-controlled reactor is a stirred tubular reactor (STR). Any type of reactor, or combination of reactors, in which a reaction mixture can move through in an essentially plug flow manner with radial mixing is also suitable. Combinations of STRs, including combinations with extruders, also may be suitable. Regardless of the type of reactor chosen, the temperature or temperature profile of the reactor is preferably controllable to the extent that a plug of the reaction mixture in a particular location within the reaction zone (i.e., the portion of the reaction system where the bulk of polymerization occurs) at time $t_1$ will have essentially the same temperature or temperature profile as another plug of the reaction mixture at that same location at some other time $t_2$. The reaction zone can include more than one temperature-controlled zone of the reactor. STRs may provide for essentially plug flow of the reaction mixture and can be configured such that good temperature control can be attained, and are therefore useful in getting the average molecular weight of the polymer product to remain close to a target value, i.e., have a narrow polydispersity range.

Referring to FIG. 1, reaction system 10 includes reaction mixture delivery system 20, optional heat exchanger 30, reactor 40, optional devolatilization mechanism 50, outlet 60, and optional recycle stream 70, which allows residual solvent to be recycled through the system. Reaction mixture delivery system 20 comprises component feed supply units 12a–12g, purification units 14a–14e, and pumps 16a–16g. The manner in which these elements are combined and controlled helps to provide, consistently over time, control over the average molecular weight distribution of the polymer produced by the described process. The polydispersities of the resulting polymers can be minimized. Polydispersity indexes of less than 3, preferably less than 2, most preferably less than 1.5 may be achieved. These low polydispersities can be achieved because the reaction system provides good mixing conditions in addition to providing a controlled temperature, which limits side reactions. Monomer to polymer conversions typically greater than 90%, 99% and up to 100% can also be achieved. Accordingly, the resulting polymerized material (solids loading) is usually comparable to the monomer weight percent concentration, which can be on the order of greater than 95%.

A. Reaction Mixture

Suitable starting monomeric materials include those that can be used to make controlled architecture materials (CAM), which are polymers of varying topology (linear, branched, star, star-branched, combination network), composition (di-, tri-, and multi-block copolymer, random block copolymer, random copolymers, homopolymer, graft copolymer, tapered or gradient copolymer, star-branched homo-, random, and block copolymers), and/or functionality (end, site specific, telechelic, multifunctional, macromonomers).

The invention allows the synthesis of polymers by step growth polymerizations, specifically traditional or living/controlled free radical, group transfer, cationic or living anionic polymerizations. The most industrially relevant methods are traditional or living/controlled free radical and living anionic polymerizations.

Specific free radical methods of making the polymers include atom transfer radical polymerization (ATRP), reversible addition-fragmentation chain transfer polymerization (RAFT), and nitroxyl- or nitroxide- (Stable Free Radical (SFR) or persistent radical-mediated polymerizations. These controlled processes all operate by use of a dynamic equilibrium between growing radical species and various dormant species (see Controlled/Living Radical Polymerization, Ed. K. Matyjaszewski, ACS Symposium Series 768, 2000).

Suitable starting materials include those with a terminal unsaturated carbon-carbon bond, such as anionically-polymerizable monomers (see Hsieh et al., *Anionic Polymerization: Principles and Practical Applications*, Ch. 5, and 23 (Marcel Dekker, New York, 1996)) and free radically-polymerizable monomers (Odian, *Principles of Polymerization*, $3^{rd}$ Ed., Ch. 3 (Wiley-Interscience, New York, 1991)).

Other suitable monomers include those that have multiple reaction sites. For example some monomers may have at least two anionically or free radically polymerizable sites. This type of monomer will produce branched polymers. This type of monomer preferably comprises less than 10 molar percent of a given reaction mixture because larger amounts tend to lead to a high degree of crosslinking in addition to branching. Another suitable monomer is one that has at least one functionality that is not anionically-polymerizable in addition to at least one anionically polymerizable site.

The temperature-control aspect of the present invention makes it useful for making temperature-sensitive polymers. Examples of temperature sensitive polymers include poly (styrenes), poly(dienes), poly((meth)acrylates), and mixtures thereof, as well as polymeric systems that degrade at elevated temperatures over long periods of time.

B. Purification and Delivery to Reactor

A system for making polymeric material per the present invention is exemplified by FIG. 1. As the figure shows, initially monomer(s) and solvent(s) are impelled from one or more of feed supplies 12a–12e to purification units 14a–14e via pumps 16a–16e and then into reactor 40. In most instances, initiator(s) and quenching agent(s) may be fed directly from feed supplies 12f and 12g, respectively, to reactor 40, for example, by pumps 16f and 16g, without passing through a purification unit 14. Because initiators can be air-sensitive, it may be desirable to feed the initiator directly to the reactor to avoid excess processing that could introduce air into the initiator supply. Quenching agents typically do not need to be purified because the presence of contaminants should not affect their functioning properly. The number of pumps and the configuration of the system, e.g., whether a purification unit is needed, will depend on the number and types of monomers being used. Some components that may be in the reaction mixture such as alkyl lithium reagents, which may be used as initiators, are notoriously sensitive to a variety of deactivating species including, inter alia, $H_2O$ and $O_2$. Therefore, when sensitive reagents are used, care must be taken to remove or exclude such deactivating species from the monomer(s), solvents, and any additives. This removal is performed by purification units 14a–14e.

Preferred purification methods include sparging the monomer(s) with an inert gas (e.g., $N_2$) and passing the combined stream of the monomer(s) and any solvent to be used in the initiator solutions through one or more purification columns. Such columns are packed with particles that selectively remove dissolved deactivating species. For example, molecular sieves and a variety of desiccants can remove $H_2O$ while activated copper can remove $O_2$ from fluids coming into contact therewith. Those skilled in the art are aware of the importance of removal of $H_2O$ and $O_2$ from reaction mixture components as well as numerous ways of accomplishing the same. Low water and oxygen concentrations, i.e., below 10 ppm, ensure that very little initiator or "living" polymer chain is deactivated. Polymerization inhibitors may be removed from monomers by treatment with basic alumina ($Al_2O_3$) chromatographic materials, as is known in the art. Initiator(s), monomer(s), and solvent(s) are then mixed at the inlet of reactor 40 or are introduced through separate inlets and mixed at some point downstream from the inlet end of reactor 40.

Initially, reaction mixture components (typically monomer(s), solvent(s), and initiator(s)) are impelled from component feed supply units, e.g., 12b, 12c, and 12d for the monomer/solvent mixture and 12f for the initiator by pumps 16b, 16c, 16d, and 16f, respectively. Other monomers, branching agents, functional quenching agent ($A_{fn}$), quenching agent ($A_n$) and solvents can be added to the reactor 40 at some point further downstream from where the initial charge of monomers. For example, additional solvents and monomers may be added from component feed supply units 12a and 12e via pumps 16a and 16e, respectively. The feed supplies will pass through a corresponding purification unit 14, if present in the system.

Although a pressure feed (i.e., a pressurized tank with a control valve) can be used for each component, the components preferably are impelled by pump mechanisms. A wide variety of pump designs can be useful in the present invention as long as the pump seal is sufficient to exclude oxygen, water, and other initiator deactivating materials from feed supply units 12a–12g. Examples of potentially useful pumps include gear pumps, diaphragm pumps, centrifugal pumps, piston pumps, and peristaltic pumps.

Some initiator systems are delivered to reactor 40 in the form of a slurry, i.e., a suspension of small particles in a solvent. For example, butyl lithium can be mixed in cyclohexane for use with diene and vinyl aromatic monomers. Such slurry initiator systems can settle in feed supply unit 12f and in pump 16f unless care is taken. A mechanism to keep the initiator system well mixed in feed supply unit 12f is preferred. Examples of such mechanisms include multiple agitator blades and a pump-around loop. Additionally, such initiator systems can be impelled to reactor 40 by a pump 16f that can easily handle slurries. Examples of suitable pumps include peristaltic and diaphragm pumps. Tubing used to transport the reaction mixture components to reactor 40 from 12a–12g must be capable of handling high pressure and of substantially excluding materials capable of deactivating the initiator being used, e.g., water and oxygen. Useful tubing materials include stainless steel, polypropylene, polyethylene, and polytetrafluoroethylene. When a peristaltic pump is used as one of pumps 16a–16g, the tubing preferably is a fluoroelastomer.

The rate at which pumps 16a–16g impel the reaction mixture components to reactor 40 can be adjusted so the residence time of the reaction mixture in reactor 40 is at or near a desired length. Typical residence times for STRs having capacities of 0.94, 2, 3.33, 4, 10 and 20 Liters (L) range from as low as five minutes up to about 300 minutes, more typically from about 10 minutes to about 50 minutes, even more typically from about 20 to about 40 minutes, and most typically about 30 minutes. Shorter residence times can result in less waste during changeover (i.e., a change in the type(s) of monomer(s), solvent(s) or initiator(s) being used, the ratio of monomers, the amount(s) of initiator(s), the targeted average molecular weight, etc.) and a substantially reduced response time to process condition changes. Of course, feed rates and reaction mixture component concentrations can vary with reactor type and degree of polymerization desired.

C. Reactor

Reactor 40 can be any type of reactor or reactor design that allows for essentially plug flow of a reaction mixture having a solids loading of above 50 weight %, as well as allowing temperature control of the reaction mixture. The reactor preferably has multiple downstream feed stream injection points. STRs are preferred. The ability to add reagents at numerous points along the reaction pathway in a STR makes the STR well suited for specifically functionalizing the end group structure of a polymer. Preferably the reactor has four or more independently temperature controlled zones. A reactor with a single temperature-controlled zone may be used but, if fewer than about four zones are used, the molecular weight polydispersity of the resulting organic material tend to be wider than desired. Notwithstanding the foregoing, when a homopolymer is being made, the reactor preferably has at least two independently temperature controlled zones.

Prior to being used in the process of the present invention, reactor 40 may be sweetened. Commonly sweetening is accomplished by filling reactor 40 with a dilute solution of initiator and allowing it to stand for, e.g., about 24 hours. Thereafter, a gaseous sparge and suitable anhydrous solvent can be used to remove the sweetening mixture.

Reaction mixture components can be delivered from purification unit 14 and the initiator feed storage unit 12g to reactor 40 by means of pressure created by pumps 16a–16g. Before reaching reactor 40, the reaction mixture components optionally can pass through heat exchanger 30.

Optional heat exchanger 30 is used when reactor 40 is to be run at a temperature above or below the temperature of the reaction mixture components prior to being introduced into reactor 40. For example, where the first section of reactor 40 is maintained at or near a temperature of 50° C., the reaction mixture preferably enters the first section of reactor 40 at or near 50° C. Where the reaction mixture components are individually maintained near room temperature (e.g., approximately 25° C.), optional heat exchanger 30 can be a preheater that raises the temperature of the combined reaction mixture components to approximately that of the first section of reactor 40. Typically, the monomer is initially at room temperature prior to entering the reactor.

Reactor 40 can be surrounded by a jacket containing a circulating heat transfer fluid (e.g., water, steam, liquid nitrogen, etc.), which serves as the means to remove heat from or add heat to reactor 40 and the contents thereof. To achieve particularly cold reaction temperatures (e.g., −78° C.), the heat transfer fluid should remain at a relatively low viscosity at the reaction temperature. For example, perfluoroethers are particularly effective at very low temperatures. To aid in temperature control, temperature sensing devices (e.g., thermometers and/or thermocouples) can extend into reactor 40 to measure the temperature of the reaction mixture passing thereby. Based on the output of the temperature sensing devices, the temperature and circulation rate of the heat transfer fluid contained in the jacket can be adjusted manually or automatically (e.g., by means of a computer controlled mechanism).

Additionally, at least a portion of reactor 40 can be enclosed by a shroud. Between the exterior of reactor 40 and the shroud is maintained an environment that effectively prevents ignition of any flammable or combustible materials that might be present in or near reaction system 10. Use of such a shroud (and the environment permitted thereby) allows general purpose electrical devices (e.g., standard heaters and motors) to be used in or with reaction system 10. Such general purpose devices often are more conducive to maintaining a desired temperature profile or producing essentially plug flow movement of the reaction mixture than are devices with higher safety ratings. Shrouded reactors are more fully described in U.S. Pat. Nos. 5,814,278, and 5,882,604, which description is incorporated herein by reference.

By dividing reactor 40 into sections and individually controlling the temperature of each section, the reaction mixture can be made to encounter a temperature profile. For example, each section of reactor 40 can be maintained at the same (or nearly the same) set temperature, thus ensuring that the reaction mixture encounters a steady temperature profile. This can be done by having separate jackets around each section or having some other means to independently control the temperature of each section. Cyclic temperature profiles also are possible. Alternatively, each successive section of reactor 40 can be maintained at a temperature higher (or lower) that the previous section, thus ensuring that the reaction mixture encounters a rising (or falling) temperature profile.

The temperatures at which the zones are maintained will depend on the materials being used and the reaction desired. The objective of controlling the temperature of each section is to ensure that the temperature of the reaction mixture is at a temperature that is conducive to the desired reaction and will not promote unwanted side reactions. If a reactor were long enough it is possible that the reaction mixture temperature could be adequately controlled with a single jacketed zone; however, such a system would be not be particularly efficient.

If desired, during the course of an ongoing polymerization, the temperature profile can be altered by changing the temperature of one or more sections. Changing the temperature profile is one way to affect the molecular weight distribution of an organic material for which the polymerization behavior of the monomers can be altered by temperature. Such monomers include methacrylate and vinyl pyridine systems. For example, when a reaction is exothermic, side reactions that can result in polymers with varying molecular weights can be limited by controlling the temperature of the reaction mixture. Typically, the temperature of the reaction mixture will increase whenever monomer is added and polymerization takes place. Therefore, an exothermic reaction may occur when a first monomer is initially fed into the reactor. Another exothermic reaction may occur downstream when a second monomer is added after the first monomer is partially or fully converted and the mixture may have cooled from the initial reaction.

In addition to temperature control, an essential feature of reactor 40 is the capability to impel, from the input end of reactor 40 to its output end, in an essentially plug flow manner, the reaction mixture contained therein. By "essentially plug flow" is meant that eddies and dead spots, where reaction mixture can be delayed in its path through reactor 40, and short circuits to the reactor outlet, which allow the reaction mixture to pass too quickly through reactor 40, are virtually nonexistent. This means that a given segment of a reaction mixture continues down the length of reactor 40 with about the same velocity profile as a segment traveling therethrough either earlier or later. The manner in which a reaction mixture is impelled through reactor 40 can be by an external means such as a pressure feed (e.g., a pump) or by an internal means (e.g., a screw in an extruder). Plug flow can be assisted by lateral mixing means (e.g., radial paddles in an STR). The reaction mixture preferably has a monomer concentration of 50 to 95 weight percent, and more preferably has a concentration of 60 to 80 weight %. These concentrations allow the reaction mixture to be more easily impelled downstream as polymer forms and increases the viscosity of the reaction mixture.

A preferred embodiment of reactor 40 is a stirred tubular reactor (STR), which may consist of a series of cylinders joined together to form a tube. Down the center of this tube, the STR may have a shaft having a plurality of paddles radiating therefrom extends along the primary axis of the tube. (Each cylinder can be jacketed as described previously.) As an external drive causes the shaft to rotate, the paddies stir the reaction mixture and assist in heat transfer. In addition, the paddles can be designed such that they assist the pumps and/or pressure head feed systems in propelling the reaction mixture through the tube. The design of STRs are known to those of skill in the art.

The tube can have a volume ranging from a fraction of a liter to several hundred liters or more depending on the number and radii of the cylinders used. The cylinders can be made of glass, tempered glass, various stainless steels, glass-lined steel, or any other material that is nonreactive with a reaction mixture passing therethrough, can exclude potential initiator deactivating materials (e.g., atmospheric $O_2$ and $H_2O$) from the interior reaction zone, can transfer heat, and can withstand elevated pressure. Preferred materials include 316 L stainless steel and low coefficient of expansion-type glass (e.g., PYREX glass, available from Corning Glass Works; Corning, N.Y.). The cylinders can be joined by means of various types of gaskets and flanges. Although the tube can be horizontal or angled, it preferably is angled upward from its input end to its output end so as to ensure that any inert gas in the STR can escape through the outlet.

The shaft can be made from a variety of inert metals, preferably stainless steel. Where a corrosive initiator such as alkyl lithium is to be used in the STR, the shaft preferably is made from a corrosion resistant stainless steel (e.g., 316 L stainless steel).

Where the shaft is hollow, it can be cooled (if desired). This can be accomplished by running a heat transfer fluid, such as water, through it.

To assist in maintaining essentially plug flow through an STR, the paddles can be designed so as to minimize reaction mixture build-up on the paddles and shaft. Build-up often occurs in stagnant regions, which are normally located on the walls of the tube or on the downstream surfaces of paddles, and can result in reduced heat transfer and plugging of the STR. This is of particular importance in polymerizations involving 2- and 4-vinyl pyridine, because the block polymerization of these materials with styrenic or diene monomers produces organized or micellar materials which can be difficult to stir or can settle on reactor walls. Because STRs are cleaned less frequently than batch reactors (and because long term continuous operation is desirable), build-up can result in a loss of residence time. Having to rid an STR of build-up can result in a loss of production time and the introduction of solvents into the STR can deactivate catalyst during future runs. Build-up and the problems resulting therefrom can be minimized by proper paddle design.

Optimization of paddle design can involve the use of cylindrical and/or streamlined designs as well as providing for narrower wall clearances toward the outer end of the STR. (See the Examples section for a description of a preferred type of paddle configuration.) Use of paddles with flexible tips (e.g., made from an elastomer such as polytetrafluoroethylene) can assist in scraping the walls of the tube. Alternatively, build-up can be minimized by periodically alternating the direction of paddle rotation. Direction can be alternated every few seconds or minutes (or whatever time frame seems to best inhibit build-up with a particular reaction mixture).

Where a gaseous monomer is used, the STR tube preferably is made from a very strong material (e.g., stainless steel) that can withstand the elevated pressure necessary to assure solubility of the gaseous monomer.

Yet another preferred embodiment of reactor 40 is a combination system where the output of an STR is pumped into the front end of an extruder. Such a combination system can take a partially converted reaction mixture exiting an STR and allow for further conversion in an extruder, upon addition of a further aliquot of monomer or by addition of a new monomer. Because the reaction mixture being fed into the extruder is already fairly viscous (e.g., usually 20,000 to several million centipoise), the need for a pressurized feed is eliminated. In such a combination system, the STR output is fed to the extruder through a heated line, preferably one that is very short (e.g., up to about three feet).

STRs and combinations of STRs and extruders have been mentioned as examples of useful designs for reactor 40. They are meant to be merely illustrative. Other designs with insubstantial differences (e.g., those that allow for essentially plug flow and temperature control of a mixture with a monomer concentration of above 50 weight %) are within the scope of the present invention when used as reactor 40.

D. Quench

Where an STR is used alone as reactor 40, a quench solution may be added to the reaction mixture soon after it exits reactor 40. This can be accomplished by blending the reaction mixture and quench feeds (not shown) through a simple T-pipe arrangement. To ensure thorough mixing of the two feeds, the combined feed can be fed into another mixer (e.g., a static mixer).

Those skilled in the art are aware of the wide variety of materials that can be used to quench various initiator systems. Commonly used examples include oxygen, water, steam, alcohols, ketones, esters, amines, hindered phenols, etc.

E. Thermal Stabilizer

Where the polymer and/or the reaction mixture is to be processed at elevated temperatures (e.g., high temperature devolatilization of the reaction mixture or hot-melt coating of the polymer), addition of a thermal stabilizer to the reaction mixture is preferred. A variety of thermal stabilizers, including hindered phenols and phosphites, are widely used in the industry. Whichever stabilizer is used, it is preferably soluble in the monomer and polymer; otherwise, a solvent will be necessary as a delivery mechanism.

In the instance where a hindered phenol has been used as the quenching agent, addition of a separate thermal stabilizer may be unnecessary.

F. Devolatilization

Where the polymer product is to be used in pure form (i.e., not mixed with monomer), unreacted monomer can be stripped out of the reaction mixture by optional devolatization mechanism 50. A variety of known devolatilization processes are possible. These include, but are not limited to, vacuum tray drying on, for example, silicone-lined sheets; wiped film and thin film evaporators (when the average molecular weight of the polymer is not too high); steam stripping; extrusion through a spinneret; and air drying.

A preferred type of devolatilization mechanism 50 is a DISCOTHERM B high viscosity processor (List AG; Acton, Mass.). Other manufacturers such as Krauss-Maffei Corp. (Florence, Ky.) and Hosokawa-Bepex (Minneapolis, Minn.) make similar processors. These types of processors have been found to be efficient in separating polymer product from the remainder of the quenched reaction mixture. If desired, such processors can be maintained at below ambient pressures so that reduced temperatures can be used. Use of reduced pressures permit the recapture of very volatile components without extensive degradation of the polymer.

The remaining components of the reaction mixture (i.e., solvent(s), and any quench solution that was used) can be disposed of or recycled. The latter option requires that, once condensed, they be separated from each other. This commonly is done by means of distillation; thus, the use of solvent(s) with boiling points that differ significantly from those of the quenching agent solution is preferred. Recycled solvent passes through purification unit 14 prior to being reintroduced into reactor 40.

G. Collection of Polymer

Once the polymer product has been isolated from the remainder of the reaction mixture, it can be collected directly from outlet 60 in a desired container.

Objects and advantages of this invention are further illustrated by the following examples. The particular materials and amounts thereof, as well as other conditions and details, recited in these examples should not be used to unduly limit this invention.

EXAMPLES

Test Methods

Molecular Weight and Polydispersity by Gel Permeation Chromatography

The average molecular weight and polydispersity of a sample was determined by Gel Permeation Chromatography (GPC) analysis. Approximately 25 mg of a sample was dissolved in 10 milliliters (mL) of tetrahydrofuran (THF) to form a mixture. The mixture was filtered using a 0.2 micron polytetrafluoroethylene (PTFE) syringe filter. Then about 150 microliters ($\mu$L) of the filtered solution was injected into a Plgel-Mixed B column (available from Polymer Labs, Amherst, Massachusetts) that was part of a GPC system also having a Waters 717 Autosampler and a Waters 590 Pump. The system operated at room temperature, with a THF eluent that moved at a flow rate of approximately 0.95 mL/min. An Erma ERC-7525A Refractive Index Detector was used to detect changes in concentration. Number average molecular weight ($M_n$) and polydispersity index (PDI) calculations were based on a calibration mode that used narrow polydispersity polystyrene controls ranging in molecular weight from $6 \times 10^2$ to $6 \times 10^6$. The actual calculations were made with Caliber software available from PolymerLabs.

Molecular Weight and Polydispersity by Light Scattering

The average molecular weight and polydispersity of some samples were determined via a triple detection method as described. Samples were prepared by the addition of 10 ml of tetrahydrofuran to approximately 25 mg of sample. The solutions were filtered using a 0.2 micron PTFE syringe filter. 100 microliters of each sample solution was injected into a column set consisting of 3×Plgel Mixed-B 10 micron GPC columns, maintained at 40° C. (Eppendorf Column Heater). The detection system used was a Wyatt Technology MiniDAWN EOS Multi-Angle Laser Light Scattering (MALLS) detector equipped with three photodetectors at various angles with respect to the incident laser beam (wavelength of laser=690 nm, power=30 mW) connected in series with a Shimadzu RID-10A Refractive Index detector to measure differences in concentration as the polymer solutions eluted through the columns. The molecular weight calculations were based upon a Zimm Formalism and the Astra (V 4.73.04) Software (Wyatt Technology Corp.) was used to calculate the absolute molecular weights.

Block Concentration

The concentration of each block was determined by Nuclear Magnetic Resonance (NMR) spectroscopy analysis. A sample was dissolved in deuterated chloroform to a concentration of about 10 wt % and placed in a Unity 500 MHz NMR Spectrometer available from Varian, Palo Alto, Calif. Block concentrations were calculated from relative areas of characteristic block component spectra.

| Materials | Description |
| --- | --- |
| Isooctyl acrylate | Available from BASF Corporation, Chemicals Division, Mt. Olive, NJ. |
| Isobornyl Acrylate | Available from Aldrich Chemical Co., Milwaukee, Wisconsin. |
| 2-Hydroxyethyl Methacrylate | Available from Aldrich Chemical Co., Milwaukee, Wisconsin |
| t-butyl peroxybenzoate | Available from Aldrich Chemical Co., Milwaukee, Wisconsin |
| o-Xylene | Available from Worum Chemical, St. Paul, Minnesota. |
| Triisobutylaluminum | Available from Aldrich Chemical Co., Milwaukee, Wisconsin. |
| 2-Ethylhexyl methacrylate | Available from BASF Corporation, Chemicals Division, Mt. Olive, NJ. |
| Hexanediol dimethacrylate | Available from Available from Sartomer, Exton, Pennsylvania |
| Isoprene | Available from Aldrich Chemical Co., Milwaukee, Wisconsin. |
| Styrene | Available from Ashland Chemical, Columbus, Ohio. |
| t-Butyl methacrylate | Available from Sans Esters Corp., New York, New York. |
| Diphenylethylene | Available from Acros/Fisher Scientific, Itasca, Illinois. |
| sec-Butyl lithium | An anionic initiator, 1.3 Molar in cyclohexane, available from Aldrich Chemical Co. |
| Toluene | Available from Worum Chemical, St. Paul, Minnesota. |
| Tetrahydrofuran (THF) | Available from ISP Technologies, Wayne, New York. |
| Cyclohexane | Available from Worum Chemical, St. Paul, Minnesota. |

Reactor Descriptions 3.33 Liter Glass STR

The STR had a capacity of 3.33 L and consisted of five jacketed (shell-and-tube) glass sections (Pyrex cylinders). The tube had an inner diameter of 4.13 cm and an outer diameter of 5.08 in. The shell had a diameter of 8.89 cm. Of the five sections, two are 60.96 cm long, two are 30.48 cm long, and one is 68.58 cm long. These were arranged in an alternating short-long fashion with the longest being last. The sections were joined together with stainless steel connector disks. The STR was closed off at both ends with stainless steel disks.

The connector disks were equipped with individual temperature sensing devices extending into the interior of the cylindrical sections. These temperature-sensing devices permitted the temperature of the reaction mixture in each section to be monitored and adjusted up or down (as necessary) to a set point by varying the temperature of the heat transfer fluid flowing through the jacketed sections.

Extending through the center of the joined cylinders was a 0.95 cm diameter stainless steel shaft suspended along the cylinder axis by shaft alignment pins. To the shaft were affixed 60 detachable stainless steel paddles with approximately 2.1 cm between each paddle. The rectangular paddles were 3.2 mm thick, 1.91 cm wide, and 3.81 cm long. The paddle configurations used was as follows; in section 1, 14 rectangular paddles; in section 2, seven rectangular paddles; in section 3, 14 rectangular paddles; in section 4, seven rectangular paddles; and in section 5, 18 rectangular paddles. The shaft was attached to a 2.2 kW variable speed motor and driven at approximately 150 rpm.

4 Liter Stainless Steel STR

The STR had a capacity of 4 L and consisted of one 316 stainless steel inlet section (21.59 cm long by 5.48 cm in diameter) and four additional stainless steel sections (316 SS), each with an outside diameter of 6.03 cm, an inside diameter of 5.48 cm, and alternating lengths of 67.31 cm and 38.58 cm. These were joined together with stainless steel clamps. The STR was closed off at both ends with stainless steel disks, and the cylindrical sections were enclosed with jackets made of stainless steel. The jackets were equipped with individual temperature sensing devices extending into the interior of the cylindrical sections. These temperature sensing devices permitted the temperature of the reaction mixture in each section to be monitored and adjusted up or down (as necessary) to a set point by varying the temperature of the heat transfer fluid flowing through the jacketed sections.

Extending through the center of the joined cylinders was a 0.95 cm diameter stainless steel shaft suspended along the cylinder axis by shaft alignment pins. To the shaft were affixed 59 detachable stainless steel paddles with approximately 1.9 cm between each paddle. The rectangular paddles were 3.2 mm thick and 1.91 cm wide and 3.81 cm long in the reactor sections. The paddle configurations used was as follows: in the inlet section, five rectangular paddles; in section 1, ten rectangular paddles; in section 2, seventeen rectangular paddles; in section 3, ten rectangular paddles; and in section 4, seventeen rectangular paddles.

Monomer Preparation and Handling

Anionic Chemistry Examples

The reactant monomers in the examples were nitrogen sparged until the $O_2$ concentration was less than 1 part per million (ppm). Deoxygenated monomer was pumped through a column (1=50 cm, d=2 cm) of basic alumina ($Al_2O_3$, Aldrich, Brockmann I, about 150 mesh,). The purified monomer was then fed directly to the first zone of a stirred tubular reactor (STR) when used for the initial block, or at a later zone of the STR for a subsequent block formation. Reaction solvents (either toluene, cyclohexane or a mixture) were pumped through molecular sieve beads (available as Zeolite 3A from UOP, Chickasaw, Ala.) and fed directly to the STR. In isoprene-based examples where a THF co-solvent was used, the THF also was deoxygenated by nitrogen sparging for 30 minutes and purified by pumping through both 3A molecular sieve beads (available as Zeolite 3A, UOP) and a column of alumina (available as $Al_2O_3$, Aldrich, Brockmann I, 150 mesh,). The THF stream was then fed directly to the first or second zone of the STR. For example 1 a sec-butyl lithium initiator (1.3 Molar (M) sec-butyl lithium in cyclohexane) was diluted by addition of pre-purified cyclohexane. For example 2 and 3, 1,1 diphenylhexyl lithium was used. For each example, the initiators were added to the first zone of the STR Free Radical Chemistry Examples No prior monomer purification was performed, however, monomers and initiator were sparged with nitrogen for 30 minutes prior to reaction.

Polymerization continued to 100% completion by the end of zone 1, thereby forming a "living" polystyrene reaction mixture polymer. At the start of zone 2, purified isoprene was delivered at various rates (via reciprocating piston pump, see Table 1) and purified THF (pressure fed at a rate of 3 g/min), resulting in a strong exotherm with a color change from red to yellow indicating the formation of polystyrene-isoprene block copolymers. The combined residence time for these reactions in the STR varied between 19 and 28 minutes, depending upon constituent flow rates (see Table 1).

Each sample was tested for number average molecular weight (Mn) and Polydispersity Index (PDI) by Light Scattering and relative block concentration of styrene to isoprene by $^1H$ NMR spectroscopy. The % solids of each sample were measured by drying a known amount of the polymer solution in a vacuum oven at 75° C. for 24 hours. The ratio of the resultant dry polymer to the starting mass of solution is defined as the % solids. Results are shown in Table 1.

TABLE 1

Quantitative Analytical Results and Experimental Conditions for PS-PI Block Copolymers:

| Example | Sample Time (Min) | Measured % solids | Predicted % solids[a] | Styrene Flow Rate (g/min) | Isoprene Flow Rate (g/min) | $M_n$ (× 10$^4$) | PDI |
|---|---|---|---|---|---|---|---|
| 1-A | 0 | 63 | 64 | 19 | 53 | 1.18 | 1.98 |
| 1-B | 30 | 67 | 64 | 19 | 53 | 1.40 | 1.97 |
| 1-C | 125 | 76 | 67 | 19 | 64 | 1.43 | 1.60 |
| 1-D | 140 | 79 | 70 | 23 | 69 | 1.72 | 1.51 |

[a]Based on Flow Rates

EXAMPLES

Example 1

Poly(styrene-isoprene) Block Copolymers

This example exemplifies that diene and styrene block copolymer materials, an important class of controlled architecture materials, can be made by this invention at high solids loading levels.

An initiator slurry was prepared by mixing 2300 g of 1.3 M sec-butyl lithium in cyclohexane with 8000 g of oxygen-free cyclohexane and stirred at room temperature for about 30 minutes. The stirring was done under nitrogen to prevent stratification and oxygen contamination. Purified styrene monomer (delivered at various rates via reciprocating piston pump, see Table 1) and purified cyclohexane solvent (delivered at a rate of 19–20 g/min via reciprocating piston pump) were passed into zone 1 of the 3.3 Liter STR. The initiator slurry was introduced by peristaltic pump at a rate of 24 ml/min into zone 1 of the STR. The solids loading of this reaction was varied as shown in Table 1. A color change, from clear to red-orange, was observed in zone 1 when the initiator solution contacted the monomer, and an exotherm resulted. The inlet temperature of zone 1 was 53.8° C. The mixture in zone 1 was kept constant at about 27° C. by adjusting the jacket temperature of zone 1 to 20° C. The temperature of the mixture in each of the 5 sections of the STR was individually maintained at: #1=27° C., #2=37° C., #3=53° C., #4=53° C., and #5=45° C. as measured at the reactor section, by adjusting the jacket temperatures as needed.

The materials flowed through the first zone of the STR facilitated by the stirring paddles along the reaction path.

Example 2

Poly(2-Ethylhexyl Methacrylate) and Poly(2-Ethylhexyl Methacrylate-t-butyl Methacrylate) Block Copolymers This example illustrates the ability to make methacrylic homopolymers and block copolymers under very high solids conditions.

An initiator slurry was prepared by mixing 775.9 ml of 1.3 M sec-butyl lithium in cyclohexane with 4133 g of oxygen-free cyclohexane and stirred at room temperature for about 30 minutes. To this solution was added 196 g of 1,1-diphenylethylene, which resulted in the formation of a red colored solution of 1,1-diphenylhexyl lithium. Purified 2-ethylhexyl methacrylate monomer (pumped via a reciprocating piston pump at a rate of 89.3 g/min) was fed into zone 1 of the 3.3 Liter STR.

The initiator solution was introduced by peristaltic pump at a rate of 35 ml/min into zone 1 of the STR along with a 1.0 M solution of triisobutyl aluminum (pressure fed at 19.8 g/min). When the initiator solution contacted the monomer an exotherm resulted (about 23° C.). The temperature of the reaction mixture in each of the 5 sections of the STR was individually maintained at: #1=38.7° C., #2=29.3° C., #3=24.2° C., #4=27.3° C., and #5=15.4° C.

The materials flowed through the five zones facilitated by stirring paddles along the reaction path. Polymerization continued to 100% completion by the end of zone 3 and the resulting viscous solution flowed from the reactor and was collected in individiual silicone lined containers. The total residence time for these reactions was about 20 minutes.

In an attempt to produce block copolymers, t-BMA was added via reciprocating piston pump at a flow rate of 8 g/min into zone 5 of the STR and allowed to procede through the reactor. Samples of PEHMA and P(EHMA-t-BMA) were taken at various times. Each sample was tested for number average molecular weight (Mn) and Polydispersity Index (PDI) by Gel Permeation Chromatography. The identity of the polymer and examination of the reaction mixture for residual monomer was conducted by $^1$H NMR spectroscopy. Results are shown in Table 2.

TABLE 2

Quantitative Analytical Results for Example 2

| Example | Sample Time (Min) | $M_n$ (× 10$^4$) | PEHMA (mole %) | Pt-BMA (mole %) | PDI | % Solids |
|---|---|---|---|---|---|---|
| 2-A | 0 | 2.3 | 100.0 | 0.0% | 2.36 | 73.7% |
| 2-B | 8 | 2.5 | 100.0 | 0.0% | 2.05 | 70.4% |
| 2-C | 22 | 2.7 | 81.7 | 18.3% | 2.81 | 76.5% |

Example 3

Poly(2-Ethylhexyl Methacrylate) Homopolymer, Poly(2-Ethylhexyl Methacrylate) Starbranched Materials, Poly(2-Ethylhexyl Methacrylate-t-butyl Methacrylate) Block and Random Copolymers.

This example illustrates the making of homo, block, random and star polymers at very high solids levels.

An initiator slurry was prepared by mixing 780 ml of 1.3 M sec-butyl lithium in cyclohexane with 8000 g of oxygen-free cyclohexane and stirred at room temperature for about 30 minutes. To this solution was added 197 g of 1,1-diphenylethylene, which resulted in the formation of a red colored solution of 1,1-diphenylhexyl lithium. A 1 wt % solution of 1,6-hexanediol dimethacrylate (HDDMA) was made by pre-dissolving 40 g of HDDMA in 4000 g of purified cyclohexane. The initiator solution was introduced by peristaltic pump at a rate of 24 ml/min into zone 1 of the 3.3 Liter STR along with a 1.0 M solution of triisobutyl aluminum (pressure fed at 4.5 g/min). Purified 2-ethylhexyl methacrylate (EHMA), t-butyl methacrylate (t-BMA) and HDDMA streams were delivered via a reciprocating piston pump at various rates and to various locations of the STR, depending upon the targeted architecture (see Table 3).

TABLE 3

Overview of Experimental Conditions

| Example | Sample Time | Sampled at end of Zone | EHMA Flow (g/min)/ Zone # | TBMA Flow (ml/min)/ Zone # | HDDMA Flow (ml/min) Zone # | Architecture |
|---|---|---|---|---|---|---|
| 3-A | 0 | 4 | 64/1 | 12/5 | — | Block Copolymer |
| 3-B | 4 | 5 | 64/1 | 12/5 | — | Block Copolymer |
| 3-C | 22 | 5 | 64/1 | 12/5 | — | Block Copolymer |
| 3-D | 57 | 5 | 64/1 | 12/3 | — | Random Copolymer |
| 3-E | 227 | 3 | 64/2 | 18/1 | — | Random Copolymer |
| 3-F | 232 | 1 | 64/2 | 18/1 | — | Random Copolymer |
| 3-G | 250 | 5 | 64/1 | — | — | Homopolymer |
| 3-H | 252 | 5 | 64/1 | — | — | Homopolymer |
| 3-I | 297 | 1 | 64/1 | — | 12/5 | Starbranched |
| 3-J | 312 | 5 | 64/1 | — | 12/5 | Starbranched |
| 3-K | 324 | 1 | 64/1 | — | 12/1 | Starbranched |
| 3-L | 347 | 1 | 64/1 | — | 12/1 | Starbranched |

Each sample was tested for number average molecular weight (Mn) and Polydispersity Index (PDI) by Gel permeation Chromatography. The identity of the polymer and examination of the reaction mixture for residual monomer was conducted by $^1$H NMR spectroscopy. Results are shown in Table 4.

TABLE 4

Experimental Solids Loading and Quantitative Analytical Results for Example 3-A thru 3-L

| Example | Time | $M_n$ (×10$^4$) | PDI | % solids |
|---|---|---|---|---|
| 3-A | 0 | 4.12 | 2.17 | 61.4 |
| 3-B | 4 | 3.91 | 2.40 | 51.1 |
| 3-C | 22 | 2.52 | 4.06 | 53.4 |
| 3-D | 57 | 2.41 | 4.10 | 51.8 |
| 3-E | 227 | 1.56 | 5.31 | 63.3 |
| 3-F | 232 | 6.27 | 3.38 | 74.2 |
| 3-G | 250 | 3.01 | 3.31 | 80.0 |
| 3-I | 297 | 7.50 | 24.40 | 53.1 |
| 3-J | 312 | 3.36 | 5.84 | 73.8 |
| 3-K | 324 | 3.37 | 4.63 | 52.2 |
| 3-L | 347 | 3.94 | 6.43 | 78.9 |

Example 4

Poly(Isooctyl Acrylate-Isobornyl Acrylate-2-Hydroxyethyl Methacrylate) IOA:IBA:HEMA Random Copolymers with 35% o-Xylene This example illustrates that a free radical polymerization mechanism can be employed in this invention to produce random, functional group-containing polymers in this approach. Here the polymerization was taken to greater than 95% conversion through control of temperatures and concentration of chain transfer reagent. The monomer solids loading for this reaction was 65 wt %.

An initiator solution was prepared by mixing 500 g of t-butyl peroxybenzoate with 10,700 g of $O_2$-free o-xylene and stirred at room temperature for about 30 minutes. Mixing 15808 g of IOA, 3952 g of IBA and 1040 g of HEMA under a nitrogen atmosphere and sparging the mixture for 30 minutes prepared a solution of IOA:IBA:HEMA. The IOA:IBA:HEMA mixture (pumped via a reciprocating piston pump at a rate of 43.3 g/min) was preheated to 68 C by passage through an external heat exchanger and the t-butyl peroxybenzoate/o-xylene stream (pumped a reciprocating piston pump at a rate of 23.3 g/min) were fed into zone 1 of a 4 Liter STR. The first zone on the STR was heated to 130° C. by means of low-pressure steam, resulting in an exotherm. The materials flowed through the first four zones in a plug-like fashion, facilitated by stirring paddles along the reaction path. Zones 2 and 3 were heated with 5 psi of steam (about 100–105° C.) to help facilitate movement of the polymer through the reactor. The temperature of the reaction mixture in each of the end of the 4 sections of the STR was measured to be: #1=152° C., #2=141° C., #3=137° C., #4=113° C. (Pressure on reactor=1 psi). This polymerization continued to very high conversion forming an IOA:IBA:HEMA copolymer. The total non-optimized residence time for these reactions was approximately 60 minutes.

Materials were sampled at various time intervals and the bulk materials were collected in 5 gallon containers. The examples were tested for Mn and PDI by Gel Permeation Chromatography, and relative incorporation of EHA, AA and BA by $^1$H NMR. Results are shown in Table 5.

TABLE 5

Quantitative results of the IOA/IBA/HEMA copolymers in mole %:

| Example | Sample Time | P(IOA) (mole %) | P(IBA) (mole %) | Xylene (mole %) | P(HEMA) (mole %) | Total Monomer (mole %) | $M_n$ (× 10$^3$) | PDI |
|---------|-------------|-----------------|-----------------|-----------------|------------------|------------------------|------------------|-----|
| 4-A | 0 | 58.7% | 19.0% | 6.2% | 15.5% | 0.6% | 5.91 | 11.44 |
| 4-B | 15 | 55.5% | 21.0% | 6.7% | 16.3% | 0.5% | 6.03 | 9.35 |
| 4-C | 30 | 56.9% | 20.4% | 6.6% | 15.6% | 0.4% | 6.02 | 7.78 |
| 4-D | 60 | 58.4% | 20.7% | 6.4% | 14.0% | 0.6% | 5.97 | 7.65 |
| 4-E | 105 | 57.4% | 17.9% | 9.9% | 14.3% | 0.5% | 5.78 | 7.69 |

TABLE 6

Quantitative results of the IOA/IBA/HEMA copolymers in mole %:

| PIBA (mole %) | PIOA (mole %) | PHEMA (mole %) | Xylene (pts/100*) | Total Monomer (pts/100*) |
|---------------|---------------|----------------|-------------------|--------------------------|
| 18.9 | 70.0 | 11.1 | 6.6 | 3.4 |

*Pts/100 = parts monomer per 100 parts polymer

Example 5

Poly(Isooctyl Acrylate-Isobornyl Acrylate-2-Hydroxyethyl Methacrylate) IOA:IBA:HEMA Copolymers with 20% o-Xylene This example illustrates that a free radical polymerization mechanism can be employed in this invention to produce random, functional group-containing polymers in this approach. The polymerization is taken to greater than 95% conversion through control of temperatures and concentration of chain transfer reagent. The monomer solids loading for this reaction is 80 wt %.

An initiator solution was prepared by mixing 361 g of t-butyl peroxybenzoate with 3400 g of $O_2$-free o-xylene and stirred at room temperature for about 30 minutes. Mixing 11433 g of IOA, 2858 g of IBA and 752 g of HEMA under a nitrogen atmosphere and sparging the mixture for 30 minutes prepared a solution of IOA:IBA:HEMA. The IOA:IBA:HEMA mixture (pumped via a reciprocating piston pump at a rate of 80.1 g/min) was preheated to 64° C. by passage through an external heat exchanger and the t-butyl peroxybenzoate/o-xylene stream (pumped via a reciprocating piston pump at a rate of 20.0 g/min) were fed into zone 1 of the 4 Liter STR. The first zone on the STR was heated to 130° C. by means of low-pressure steam, resulting in an exotherm. The materials flowed through the first four zones in a plug-like fashion, facilitated by stirring paddles along the reaction path. Zones 2 and 3 were heated with 5 psi of steam (about 100–105° C.) to help facilitate movement of the polymer through the reactor. The temperature of the reaction mixture in each of the end of the 4 sections of the STR was measured to be: #1=172° C., #2=183° C., #3=145° C., #4=111° C. The total un-optimized residence time for these reactions was about 40 minutes.

Materials were sampled at various time intervals and the bulk materials were collected in 5 gallon containers. A representative example was tested relative incorporation of EHA, AA and BA by $^1$H NMR spectroscopy. Results are shown in Table 6.

Example 6

Poly(Isooctyl Acrylate-Isobornyl Acrylate-2-Hydroxyethyl Methacrylate) IOA:IBA:HEMA Copolymers with 5% o-Xylene This example illustrates that a free radical polymerization mechanism can be employed in this invention to produce random, functional group-containing polymers in this approach. The polymerization is taken to greater than 95% conversion through control of temperatures and concentration of chain transfer reagent. The monomer solids loading for this reaction is 95 wt %.

An initiator solution was prepared by mixing 500 g of t-butyl peroxybenzoate with 596 g of $O_2$-free o-xylene and stirred at room temperature for about 30 minutes. Mixing 15833 g of IOA, 3958 g of IBA and 1041 g of HEMA under a nitrogen atmosphere and sparging the mixture for 30 minutes prepared a solution of IOA:IBA:HEMA. The IOA:IBA:HEMA mixture (pumped via an FMI at a rate of 95 g/min) was preheated to 68° C. by passage through an external heat exchanger and the t-butyl peroxybenzoate/o-xylene stream (pumped via an FMI at a rate of 5 g/min) were fed into zone 1 of the 4 Liter STR. The first zone on the STR was heated to 130° C. by means of low-pressure steam, resulting in an exotherm. The reaction temperature was not controlled by external measures. The materials flowed through the first four zones in a plug-like fashion, facilitated by stirring paddles along the reaction path. Zones 2 and 3 were heated with 5 psi of steam (about 100–105° C.) to help facilitate movement of the polymer through the reactor. The temperature of the reaction mixture in each of the end of the 4 sections of the STR was measured to be: #1=196° C., #2=153° C., #3=141° C., #4=119° C. (Pressure on reactor=2.2 psi). The total non-optimized residence time for these reactions was about 40 minutes.

Analytical results for this series of polymerizations as a function of initial xylene content are shown in Table 7.

TABLE 7

Quantitative results of the IOA/IBA/HEMA copolymers.

| Example | Sample Time | PIBA (mole %) | PIOA (mole %) | PHEMA (mole %) | Xylene (pts/100*) | Total Monomer (pts/100*) |
|---|---|---|---|---|---|---|
| 6-A | 0 | 17.1 | 73.2 | 9.7 | 7.0 | 7.5 |
| 6-B | 65 | 17.6 | 73.0 | 9.4 | 5.6 | 5.7 |
| 6-C | 140 | 17.6 | 69.0 | 13.4 | 4.6 | 4.5 |
| 6-D | 190 | 16.9 | 71.5 | 11.6 | 4.8 | 4.7 |

*Pts/100 = parts monomer per 100 parts polymer

Various modifications and alterations that do not depart from the scope and spirit of this invention will become apparent to those skilled in the art. This invention is not to be unduly limited to the illustrative embodiments set forth herein.

We claim:

1. A continuous process for making an organic material having a targeted architecture comprising
   a) introducing into a plug flow reactor having one or more temperature controlled sections a reaction mixture comprising at least one polymerizable monomer, an initiator system, and an optional solvent system such that the monomer concentration is above 50 weight %;
   b) allowing the monomer to polymerize as the reaction mixture travels in an essentially plug flow manner through the reactor, whereby conversion of monomer to polymer of at least 90% is achieved; and
   c) discharging the polymerized organic material.

2. The method of claim 1 wherein the resulting polymer is oligomeric.

3. The process of claim 1 wherein at least one monomer is temperature-sensitive.

4. The process of claim 1 wherein at least one monomer has a low molecular weight.

5. The process of claim 1 wherein at least two monomers are simultaneously introduced into the reactor such that a random copolymer is formed.

6. The process of claim 5 further comprising adding at least one temperature-sensitive monomer to the reaction mixture comprising the random copolymer.

7. The process of claim 3 wherein the temperature-sensitive monomer is vinyl pyridine or alkyl methacrylate.

8. The process of claim 7 wherein the vinyl pyridine monomer is 2-vinyl pyridine or 4-vinyl-pyridine.

9. The process of claim 7 wherein the temperature-sensitive monomer is vinyl pyridine and the initiator is selected from the group comprising n-butyl lithium, sec-butyl lithium, tert-butyl lithium, fluorenyl lithium, naphthyllithium, phenyllithium, and p-tolyllithium.

10. The process of claim 7 wherein the alkyl methacrylate monomer is selected from the group comprising tert-butyl methacrylate, methyl methacrylate, isodecyl methacrylate, n-$C_{12}H_{25}$, n-$C_{18}H_{37}$, allyl methacrylate, 2-ethylhexyl methacrylate, 2-(N-methylperfluorobutanesulfonamido) ethyl methacrylate and glycidyl methacrylate.

11. The process of claim 7 wherein the monomer is alkyl methacrylate and the initiator is selected from the group comprising α-methylstyrene-lithium, and 1,1-diphenylhexyllithium.

12. The process of claim 7 further comprising: quenching the organic material with a quenching agent after step c).

13. The process of claim 1 further comprising adding one or more steps between b) and c) above wherein one or more polymerizable monomers are sequentially added to the reaction mixture such that a block copolymer is formed as the reaction mixture continues through the plug flow reactor.

14. The process of claim 13 wherein at least one of the polymerizable monomers is temperature-sensitive.

15. The process of claim 1 wherein at least one anionically-polymerizable monomer has at least two anionically-polymerizable sites.

16. The process of claim 1 wherein at least one anionically-polymerizable monomer has at least one functional site in addition to an anionically-polymerizable site.

17. The process of claim 1 further comprising removing the solvent from the reaction mixture containing the polymerized organic material after c).

18. The process of claim 1 wherein the reactor has two or more temperature-controlled sections and each is maintained between −78° C. and 220° C.

19. The process of claim 1 wherein the reactor is a stirred tubular reactor.

20. The process of claim 1 wherein the reactor is a combination of a stirred tubular reactor and an extruder.

21. The process of claim 1 wherein the monomer is selected from the group comprising styrenics, dienes, vinyl pyridines, alkyl methacrylates, epoxides, oxiranes, cyclic sulfides, lactones, lactides, cyclic carbonates, lactams, cyclosiloxanes, acrylonitrile, and metallocenophanes, as well as anionically-polymerizable polar monomers.

22. The process of claim 1 wherein the monomers of the system are selected from the group consisting of styrene, p-methylstyrene, isoprene, isoprene-derivatives, isodecylmethacrylate, t-butyl acrylate, t-butyl methacrylate, vinyl pyridine, vinyl pyridine derivatives, ethylene oxide, hexamethyltrisiloxane, and butadiene.

23. The process of claim 1 wherein the monomers of the system are selected from the group consisting of vinyl aromatics, styrenics, dienes, vinyl pyridines, alkyl acrylates, alkyl methacrylates, ethylene, halogenated olefins, vinyl esters, acrylonitrile, methacrylonitrile, acrylamides, methacrylamides, Vinyl metallocenes, N-vinyl pyrrolidone, and N-vinyl carbazole.

* * * * *

UNITED STATES PATENT AND TRADEMARK OFFICE
CERTIFICATE OF CORRECTION

PATENT NO. : 6,716,935 B1
DATED : April 6, 2004
INVENTOR(S) : Nelson, James M.

It is certified that error appears in the above-identified patent and that said Letters Patent is hereby corrected as shown below:

Column 4,
Line 56, please insert -- . -- following "provided".

Column 5,
Line 17, please insert -- . -- following "concentrations".

Column 10,
Line 33, please delete "paddies" and insert in place thereof -- paddles --.

Column 15,
Line 14, please insert -- . -- following "STR".
Line 63, please insert -- end of each -- following "the".

Column 17,
Line 1, please delete "procede" and insert in place thereof -- proceed --.

Signed and Sealed this

Twenty-seventh Day of July, 2004

JON W. DUDAS
*Acting Director of the United States Patent and Trademark Office*